US007794620B2

(12) United States Patent
Kasch et al.

(10) Patent No.: US 7,794,620 B2
(45) Date of Patent: Sep. 14, 2010

(54) CHOLESTERIC MONOLAYERS AND MONOLAYER PIGMENTS WITH PARTICULAR PROPERTIES, THEIR PRODUCTION AND USE

(75) Inventors: Michael Kasch, Burghausen (DE); Adolf Gurtner, Wildenau (AT)

(73) Assignee: SICPA Holding S.A., Prilly (CH)

( * ) Notice: Subject to any disclaimer, the term of this patent is extended or adjusted under 35 U.S.C. 154(b) by 392 days.

(21) Appl. No.: 11/720,956

(22) PCT Filed: Nov. 28, 2005

(86) PCT No.: PCT/EP2005/056260

§ 371 (c)(1),
(2), (4) Date: Jul. 6, 2007

(87) PCT Pub. No.: WO2006/063926

PCT Pub. Date: Jun. 22, 2006

(65) Prior Publication Data

US 2008/0305315 A1  Dec. 11, 2008

(30) Foreign Application Priority Data

Dec. 16, 2004  (DE) .................. 10 2004 060 628

(51) Int. Cl.
  *C09K 19/00* (2006.01)
  *C09K 19/06* (2006.01)
  *C09K 19/52* (2006.01)
  *G02F 1/13* (2006.01)
  *G02F 1/03* (2006.01)

(52) U.S. Cl. .............. 252/299.01; 252/299.6; 428/1.1; 430/20; 430/270.1; 349/187

(58) Field of Classification Search .......... 430/20, 430/270.1; 428/1.1; 252/299.01, 299.6; 349/187
See application file for complete search history.

(56) References Cited

U.S. PATENT DOCUMENTS

| 5,211,877 A | 5/1993 | Andrejewski et al. |
| 5,362,315 A | 11/1994 | Muller-Rees et al. |
| 5,851,604 A * | 12/1998 | Muller-Rees et al. ...... 428/1.31 |
| 6,423,246 B1 * | 7/2002 | Kasch et al. ........... 252/299.01 |

FOREIGN PATENT DOCUMENTS

| DE | 4240743 | 6/1994 |
| DE | 4416191 | 11/1995 |
| DE | 19619973 | 11/1997 |
| DE | 19820225 | 11/1999 |
| DE | 19922158 | 11/2000 |
| EP | 0601483 | 6/1994 |
| EP | 0686674 | 12/1995 |
| EP | 1017755 | 1/2003 |
| EP | 1009776 | 12/2003 |

* cited by examiner

*Primary Examiner*—Geraldina Visconti
(74) *Attorney, Agent, or Firm*—Shoemaker and Mattare

(57) ABSTRACT

The invention provides novel cholesteric monolayers and pigments obtained therefrom with high brilliance and viewing angle-dependent color change (color-flop/tilt effect) with additional particular properties such as magnetizability, conductivity, fluorescence, phosphorescence and increased hiding power, a process for their production and their use.

12 Claims, No Drawings

CHOLESTERIC MONOLAYERS AND MONOLAYER PIGMENTS WITH PARTICULAR PROPERTIES, THEIR PRODUCTION AND USE

The invention provides novel cholesteric monolayers and pigments obtained therefrom with high brilliance and viewing angle-dependent colour change (colour-flop/tilt effect) with additional particular properties such as magnetizability, conductivity, fluorescence, phosphorescence and increased hiding power, a process for their production and their use.

Materials having a liquid-crystal (LC) structure with a chiral phase (LC materials), also known as cholesteric LCs, are known. The production of such materials from LC organosiloxanes is described, for example, in the U.S. Pat. No. 5,211,877. Pigments with oriented three-dimensionally crosslinked substances with liquid-crystalline structure and chiral phase (LC pigments) are likewise produced commercially and used. This is described, for example, in the German laid-open specification DE 42 40 743 A1 and in the U.S. Pat. No. 5,362,315.

Cholesteric LC layers are preferably highly transparent and reflect light or allow it to pass. What is characteristic of these layers is a selective colour reflection as a function of the viewing angle (colour-flop/tilt effect), also known as optical variability. Absorption does not occur in LC layers. Therefore, cholesteric layers or pigments produced therefrom by comminution do not possess any hiding power and, to generate colour, have to be applied to dark backgrounds, ideally to a black background, so that the light fraction transmitted by them is absorbed by the background and their reflection colour, dependent on the viewing angle can be perceived. Alternatively, they can be formulated with absorbent pigments, for example carbon black. The significant disadvantage of this method is that a portion of their colour effect is eliminated, since the opaque pigments cover some of the LC pigment platelets which can no longer contribute to the reflection and thus to the colour effect.

When additional properties, for example conductivity, magnetism, changed colour (coloristic properties) or hiding power are to be introduced into these LC layers, the difficulty is that, when absorbent or opaque or other non-liquid-crystalline materials are added to cholesteric LC mixtures, their orientability is impaired, as a result of which reflection properties and thus colour and also brilliance are lost or at least greatly reduced. These disadvantages are confirmed in the European patent EP 1 009 776 B1, since the incorporation of extraneous pigments into the cholesteric matrix results in a considerable portion of the reflected wavelength of the LC pigment being absorbed or scattered, so that the particular advantage of cholesteric interference pigments is substantially eliminated.

An additional problem is disclosed by the European patent EP 1 009 776 B1, in that a good fine dispersion of extraneous pigments in the cholesteric matrix is needed. Such a dispersion can be effected only in combination with additives adjusted to the pigment surface, for example fatty acids or lecithins, which, though, disrupt the formation of the helical orientation and thus optimal colour development. As a consequence, cholesteric interference pigments which give the impression of unattractive colour and have a low colour-flop/tilt effect are obtained.

The European laid-open specifications EP 0 601 483 A1 and EP 0 686 674 A1 describe the incorporation of carbon black or pigments into the cholesteric matrix.

A possible solution to this problem is indicated in the patents EP 1 017 755 B1, EP 1 009 776 B1 and DE 196 19 973 A1, for example for the attainment of better hiding power in cholesteric LC layers or LC pigments obtained therefrom. A multilayer product is produced. This consists of a sandwich of two outer, oriented polymerized cholesteric LC layers and a middle, non-liquid-crystalline, partly or fully light-absorbent layer which comprises, for example, carbon black as an absorptive additive. According to the European patent EP 1 017 755 B1, this absorptive additive may additionally also possess magnetic properties. EP 1 017 755 B1 thus explicitly rejects the possibility of incorporating any kind of particles into a single cholesteric LC layer; instead, the provision of an additional separate layer with such particles is proposed.

When LC pigments are obtained from the multilayer films, as, for example, in DE 198 20 225 A1, they have a hiding power which is little influenced by the background and exhibit a brilliant and colour-changing surface irrespective of which side lies on the background. The disadvantage of these approaches to a solution is that these laminates can be obtained only by a complicated and multistage process. Moreover, the pigments obtained by comminution from this laminate have a high thickness. Thus, they do not correspond to the customary thickness requirements on pigments for coatings and printing inks, since the scope of application for platelet-shaped pigments for a wide variety of coating and printing technologies generally increases with thinner layer thickness of the platelets. In addition, as described in the German laid-open specification DE 198 20 225 A1, there is the risk in multilayer cholesteric pigments of delamination of the absorber layer from the LC layer.

It is therefore an object of the present invention to provide three-dimensionally crosslinked cholesteric monolayers and cholesteric pigments obtained therefrom, which exhibit high brilliance, colour reflection power and colour-flop/tilt effect, and have additional properties, for example increased hiding power, conductivity, luminescence, fluorescence, phosphorescence, coloristic properties changed compared to the original LC mixture without additives or magnetism, without a further material layer comprising these additional properties having to be added additionally.

It has been found that, surprisingly, the underlying object of the invention can be achieved by, in contrast to the prior art, incorporating nanoparticles which bear additional properties directly into the cholesteric matrix, as a result of which LC layers and LC pigments with increased hiding power and/or other properties such as magnetism can be provided without leading to the above-detailed disadvantages.

The present invention therefore provides cholesteric liquid-crystal monolayers and monolayer pigments comprising nanoparticles. These layers and pigments are preferably prepared by admixing the nanoparticles to the cholesteric liquid-crystal mixtures at a temperature above the clearing point of the cholesteric liquid-crystal mixture.

According to the present invention, nanoparticles are understood to mean particles which have a particle size in the nanometer range, i.e. of 1 to 999 nm, preferably of 10 to 500 nm.

According to the present invention, a monolayer shall be understood to mean a single layer which is not in contact with other layers comprising cholesteric liquid-crystalline material. A monolayer pigment according to the present invention comprises a single layer with a three-dimensionally crosslinked cholesteric liquid-crystal mixture and nanoparticles.

The inventive cholesteric liquid-crystal mixtures comprise preferably
A) 0.01-50% by weight, based on the total solids content, preferably 0.1-10% by weight, of nanoparticles selected from the group consisting of metal oxides, iron oxides, magnetic powders, zinc oxide, carbon blacks, graphites, fumed silicas, luminescent pigments, fluorescent pigments, phosphorescent pigments, metals, metal alloys and chromatic pigments or mixtures thereof, B) 20-99.5% by weight, based on the total solids content, preferably 60-99% by weight, of at least one or more than one three-dimensionally crosslinkable compound of the average general formula (1)

$$Y^1\text{-}A^1\text{-}M^1\text{-}A^2\text{-}Y^2 \qquad (1),$$

in which $Y^1, Y^2$ are the same or different and are each a polymerizable group, for example as acrylate or methacrylate radical, epoxy radical, isocyanate, hydroxyl, vinyl ether or vinyl ester radical, $A^1, A^2$ are identical or different radicals of the general formula $C_nH_{2n}$ in which n is an integer of 0 to 20 and one or more methylene groups may be replaced by oxygen atoms, and $M^1$ has the general formula $$-R^1-X^1-R^2-X^2-R^3-X^3-R^4-,$$

$R^1, R^2, R^3, R^4$ are identical or different divalent radicals selected from the group of —O—, —COO—, —CONH—, —CO—, —S—, —C≡C—, —CH=CH—, —N=N—, —N=N(O)— or a C—C bond, and $R^2-X^2-R^3$ or $R^2-X^2$ or $R^2-X^2-R^3-X^3$ may also be a C—C bond, $X^1, X^2, X^3$ are identical or different radicals selected from the group consisting of 1,4-phenylene, 1,4-cyclohexylene, $B^1$-, $B^2$- and/or $B^3$-substituted arylenes or heteroarylenes having 6 to 10 atoms in the aryl ring which may contain 1 to 3 heteroatoms from the group consisting of O, N and S, or $B^1$-, $B^2$- and/or $B^3$-substituted cycloalkylenes having 3 to 10 carbon atoms, and $B^1, B^2, B^3$ are identical or different substituents selected from the group consisting of hydrogen, $C_1$-$C_{20}$-alkyl, $C_1$-$C_{20}$-alkoxy, $C_1$-$C_{20}$-alkylthio, $C_2$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —NO$_2$, formyl, acetyl, and alkyl, alkoxy or alkylthio radicals each interrupted by ether oxygen, thioether sulphur or ester groups and having 1-20 carbon atoms, C) 0.5 to 80% by weight, based on the total solids content, preferably 3 to 40% by weight, of at least one or more than one chiral compound of the average general formula (2)

$$V^1\text{-}A^1\text{-}W^1\text{—}Z\text{—}W^2\text{-}A^2\text{-}V^2 \qquad (2),$$

in which $V^1, V^2$ are the same or different and are each an acrylate or methacrylate radical, epoxy radical, vinyl ether or a vinyl ester radical, isocyanate radical, $C_1$-$C_{20}$-alkyl, $C_1$-$C_{20}$-alkoxy, $C_1$-$C_{20}$-alkylthio, $C_1$-$C_{20}$-alkoxycarbonyl, $C_1$-$C_{20}$-alkylthiocarbonyl, —OH, —F, —Cl, —Br, —I, —CN, —NO$_2$, formyl, acetyl, and alkyl, alkoxy or alkylthio radicals each interrupted by ether oxygen, thioether sulphur or ester groups and having 1-20 carbon atoms, or a cholesterol radical, $A^1, A^2$ are each as defined above, $W^1, W^2$ each have the general formula $$-R^1-X^1-R^2-X^2-R^3-,$$

$R^1, R^2, R^3$ are each as defined above and $R^2$ or $R^2-X^2$ or $X^1-R^2-X^2-R^3$ may also be a C—C bond, $X^1, X^2$ are each as defined above and Z is a divalent chiral radical from the group comprising dianhydrohexitols, hexoses, pentoses, binaphthyl derivatives, biphenyl derivatives, tartaric acid derivatives or optically active glycols and, in the case that $V^1$ or $V^2$ is a cholesterol radical, is a C—C bond.

According to the present invention, all conventional nanoparticles in the sense of the present definition may be used. Such nanoparticles are commercially available or can be produced in common ways known to those skilled in the art, for example by comminuting larger particles by, for example, grinding processes, or advantageously by direct synthesis from soluble or gaseous precursors under controlled conditions (colloid technology). According to the invention, the nanoparticles have additional properties, for example increased hiding power, conductivity, luminescence, fluorescence, phosphorescence or magnetism. These additional properties may be utilized, for example, as additional safety features.

Magnetic nanoparticles may be selected, for example, from the group of ferromagnetic elements, for example iron, cobalt, nickel or alloys or mixed oxides thereof, such as the ferrites $M^{II}O \times Fe_2O_3$ where the divalent metal M used is, for example, zinc, cadmium, cobalt, manganese, copper or magnesium. With iron as the divalent metal, the result is, for example, magnetite $Fe_3O_4$. Particular preference is given to the use of $\gamma$-$Fe_2O_3$ or $CrO_2$ as magnetic nanoparticles. Moreover, the magnetic nanoparticles may also include aluminium-nickel-cobalt alloys with main constituents such as iron, cobalt, nickel, copper or titanium, for example.

In the context of this invention, luminescence encompasses, as a generic term, fluorescence and phosphorescence, which differ substantially in the decay times of continued luminescence. Luminescent nanoparticles may consist, for example, of organic fluorescent pigments such as bis(azomethine) pigments or inorganic materials such as apatites, fluorites, calcites, corundums, etc. The inorganic luminescent materials may either be of natural (fluorite, etc.) or synthetic (zinc sulphide, etc.) origin, and the luminescence may originate from any type of luminescent site (main group, transition group or rare earth atom, ion or atomic group, etc.).

Compared to the European laid-open specifications EP 0 601 483 A1 and EP 0 686 674 A1, in which the incorporation of carbon black or pigments into the cholesteric matrix is described, the cholesteric liquid-crystal monolayers and monolayer pigments comprising nanoparticles have the surprising advantage that the use of nanoparticles as additives affords substantially more brilliant and more attractive colour reflection of the resulting cholesteric layer or of the pigments obtained therefrom.

In a further preferred embodiment, organic nanoparticles with absorption properties, for example azo pigments, metal complex pigments, for example azo and azomethine metal complexes, isoindolinone and isoindoline pigments, phthalocyanine pigments, quinacridone pigments, perinone and perylene pigments, anthraquinone pigments, diketopyrrolopyrrole pigments, thioindigo pigments, dioxazine pigments, triphenylmethane pigments and quinophthalone pigments.

According to the invention, suitable nanoparticles with chromatic pigment, black pigment or white pigment properties are, for example, metal oxides such as $TiO_2$, $ZrO_2$, $Al_2O_3$, $ZnO$, $SnO_2$, iron oxides, especially including black magnetite ($Fe_3O_4$), chromates, vanadates and sulphides, a wide variety of carbon black types, especially readily dispersible pigment blacks, graphite pigments and overdyed white pigment particles.

In a preferred embodiment, the nanoparticles have not been treated on the surface, for example with additives adjusted to the pigment surface, such as fatty acids or lecithins, which surprisingly does not, though, lead to the described disadvantages of the prior art in the form of unsatisfactory dispersion.

In a further embodiment, the nanoparticles used may be fumed silicas in their various particle dimensions and embodiments, for example as hydrophilic or hydrophobic variants.

A particularly preferred liquid-crystal mixture is based on the use of crosslinkable organosiloxanes or on substances with thermotropic twisted nematic, smectic, discotic or lyotropic phase.

The invention provides crosslinked liquid-crystal monolayers, preferably having a film thickness of 0.5 to 50 μm, obtainable by polymerization of a three-dimensionally crosslinking, cholesteric liquid-crystal mixture comprising nanoparticles.

The invention further provides a process for the production of liquid-crystal monolayers, characterized in that a three-dimensionally crosslinking cholesteric liquid-crystal mixture comprising nanoparticles is used to obtain a film, preferably having a thickness of 0.5 to 50 μm, on a support, and the three-dimensional polymerization of the liquid-crystal film is performed, for example by means of electron beam curing, ultrasound polymerization or UV polymerization.

The three-dimensionally crosslinking, cholesteric liquid-crystal mixture comprising nanoparticles is preferably obtained by admixing nanoparticles to a three-dimensionally crosslinking cholesteric liquid-crystal mixture at a temperature above the clearing point with methods known from the prior art, for example Dispermats, extruders, roll mills, static mixers and dissolvers.

The polymerization is preferably effected by UV crosslinking, in which 0.1 to 3% by weight, preferably 0.5 to 1.5% by weight, of photoinitiator are added to the inventive, three-dimensionally crosslinking, cholesteric liquid-crystal mixture. If appropriate, stabilizers may also be added at a content of 50 to 3000 ppm, preferably of 200 to 1000 ppm, in order to prevent premature and uncontrolled polymerization.

Preference is given to obtaining a 1 to 5 μm-thick film on a support, for example a PET film. This is preferably done by roll- or knife-coating at belt speeds of 1 to 200 m/min. The film formation is more preferably effected at 20 to 80 m/min. Further preferred embodiments work with a laminating film made, for example, of PET, or under inert conditions, for example under N2 atmosphere.

Thus, inventive cholesteric liquid-crystal monolayers with high brilliance and colour reflection capacity with flip-flop/tilt effect are obtained, which may be used as a security marking.

The inventive monolayers are preferably used, for example, as a constituent of a laminate as a security strip or in the form of a film element similar to a hologram or kinegram on banknotes or certificates or other documents of value.

These monolayers may be processed further by a process according to the invention to give cholesteric liquid-crystal monolayer pigments. For this purpose, the monolayer is removed from the support by means of a suitable erosion unit, for example a stripping unit or stripping blade, to form coarse liquid-crystal flakes which are comminuted with suitable tools, for example milling or cutting units, to give liquid-crystal pigments, and optionally classified by means of sieving and sifting. The pigments prepared in accordance with the invention preferably have a thickness of from 0.1 to 50 μm and a diameter of from 10 to 1000 μm. They more preferably have a thickness of from 0.5 to 6 μm and a diameter of from 1 to 200 μm.

A further preferred embodiment for the production of liquid-crystal monolayers and pigments is effected from an organic solution of the LC mixture components with appropriate dispersed nanoparticles. In this case, solution coating is effected while retaining the other boundary conditions, the solution coating involving the initial evaporation of the solvent after the wet film coating and before the polymerization is effected. The advantage of this variant lies in simpler dispersion, for example by means of ultrasound, of the additives in solution.

The inventive liquid-crystal pigments thus obtained may be used for printed products, for the production of paints and inks, for the colouring of plastics and for the production of magnetic strips. They have the advantage that they can be produced in very low thicknesses while retaining the desired properties and are thus available for a very broad field of application.

Inventive pigments may, formulated as printing inks for example, be used for printable optical features, for example on the documents of value mentioned, the advantage being that a further feature is integrated in addition to the uncopiable colour-tilt effect. This feature may be designed as an obvious or hidden feature.

The invention further provides for the use of inventive liquid-crystal pigments comprising nanoparticles with magnetic properties for producing structured, printed, optically variable safety features, in which an additional alignment pattern is obtained by applying an external magnetic field during the curing phase of a printing ink which comprises magnetic nanoparticles comprising the inventive liquid-crystal pigment. In a preferred embodiment, in the case of the inventive, magnetic, cholesteric LC pigments, a magnetic field is therefore applied to the printed substrate directly after the printing of the corresponding printing ink to a preferably dark background before curing of the binder, so that alignment patterns of the magnetic LC pigments in the printed feature are obtained in accordance with the selected magnetic field geometry, since the platelet-shaped magnetic pigments are aligned along the field lines. A crucial factor for such a process is the correct adjustment of the viscosity of the binder. When a printed pattern treated in this way is subsequently cured under the action of this external magnetic field, an optically variable feature is obtained which, in addition to the human recognition feature of colour-flop and the circular polarization effect of reflected light known from cholesteric materials, possesses permanent information in the form of an alignment pattern of the pigments. In this way, an individual personalization means of the optically variable safety feature is provided. This additional personalization pattern has the advantage that it increases the anti-forgery security. Depending on the design, such an individual pattern as an obvious feature can be recognized even by a layman without further aids and can be employed to distinguish original from forgery. The printing ink binders used for such a process may have a solvent- or water-based formulation or be designed as a UV-curing system.

Possible printing methods which can be considered as options for the inventive cholesteric liquid-crystal pigments include the processes from the group comprising screen-printing, flexographic printing and gravure printing, but also, for example, offset and intaglio printing or pad printing.

In addition, it is also possible to use inventive liquid-crystal pigments in coatings for industrial or automotive applications. Further possible uses of inventive liquid-crystal pigments are the colouring of plastics via masterbatches or compounding, and also the use as writable and readable variable-colour magnetic strips.

The present invention is illustrated in detail below with reference to nonrestrictive examples.

EXAMPLES

Example 1

Preparation of a Chiral Compound di-2,5-[4-(acryloyloxy)benzoyl]isosorbide 20.0 g of isosorbide (137 mmol) and 73.2 g of triethylamine (723 mmol) were dissolved in 120 ml of toluene. At 80° C., a solution of 60.5 g (287 mmol) of 4-(acryloyloxy) benzoyl chloride (prepared according to Lorkowski, H. J.; Reuther, F. Acta Chim. Acad. Sci. Hung. 1977, 95, 423-34) was added dropwise to 60 ml of toluene. The mixture was stirred at 80° C. for 2 h, then admixed at room temperature with 80 ml of 10% hydrochloric acid, the organic phase was washed with water (2×80 ml) and 10% sodium hydrogencarbonate solution (80 ml) and dried over sodium sulphate, and the solvent was removed under reduced pressure down to a toluene content of about 20% by weight. The resulting syrup was admixed with 220 ml of ethanol and 200 ml of cyclohexane and heated to 80° C. with stirring. After cooling and filtration, the di-2,5-[4-(acryloyloxy)benzoyl]isosorbide was obtained in a yield of 45.9 g (68% of theory) with a melting point of 115° C.

Example 2

Green Liquid-crystalline Mixture 93 g of hydroquinone bis[4-(4-acryloylbutoxy)benzoate] (obtainable according to Broer, D. J.; Mol, G. N.; Challa, G. Makromol. Chem. 1991, 192, 59), 7 g of 2,5-bis[4-(acryloyloxy)benzoyl]isosorbide (obtainable according to Example 1), 1.00 g of Irgacure® 819 photoinitiator and 0.20 g of 2,6-di-tert-butyl-4-dimethylaminomethylene)phenol (Ethanox® 703, Ethyl Corp., Baton Rouge, La. 70801) were weighed in. By means of a precision glass stirrer, the mixture was homogenized at oil bath temperature 150° C. until a clear melt was obtained. The mixture has a clearing point of 146° C. and a viscosity of approx. 200 mPas at 100° C. A film of this mixture, which had been produced between two microscope slides by shearing at 110° C. and crosslinked under a UV laboratory lamp, possessed, when viewed on a black background, a brilliant green colour which changed to blue when the viewing angle was increased. The reflection maximum of this film at 0°/6° (Perkin-Elmer Lambda 18 UV/VIS spectrometer) was at 516 nm.

Example 3

Production of an Inventive Green Liquid-crystal Mixture With Dispersed Magnetic Powder 1.5 kg of a green liquid-crystal mixture, obtainable according to Example 2, were melted at 130° C. in a drying cabinet and 75 g of black magnetic powder MR 210 (200 nm, MR-Chemie GmbH, D-59427 Unna) were subsequently dispersed therein at 110° C. for 40 min in a laboratory dissolver (from PC Labosystem, Switzerland) at maximum shear speed. A film of this mixture, which had been produced between two microscope slides by shearing at 110° C. and crosslinked under a UV lamp, possessed, when viewed on a black background, a brilliant metallic green colour which changed to blue when the viewing angle was increased. The viewing angle-dependent colour change was clearly perceptible even on a white background.

Example 4

Production of an Inventive Cholesteric LC Film

The green LC mixture with dispersed magnetic powder, obtainable according to Example 3, was applied as a melt at 100° C. by means of roll coating to a PET film (RNK 19, Mitsubishi Polyester Film, 65023 Wiesbaden) to give a thin film of thickness approx. 4 μm and, for better orientation and prevention of oxygen inhibition of the LC molecules, laminated with a second PET film. The laminated LC film was subsequently three-dimensionally crosslinked under UV light on the coating machine and the laminating film was removed again. The film thus obtained, when viewed with a black background underneath, exhibited a brilliant metallic green colour which, when the film was tilted, changed to a brilliant blue. This colour change can be seen clearly even on non-absorbent backgrounds.

Example 5

Production of Inventive Cholesteric LC Pigments with Increased Hiding Power and Magnetic Properties An LC film with finely dispersed magnetic powder, obtainable according to Example 4, was removed from the support film with an erosion system to obtain coarse flakes. The flakes were ground in a laboratory mill and the ground material was sieved through a 40 μm sieve. The pigments thus obtainable possessed a mean platelet diameter of approx. 35 μm. A knife application of 3% by weight of these pigments in a transparent binder (for example Tinted Clear Additive Deltron 941, PPG Industries, UK-Suffolk TP14 2AD) exhibited, on a black background, a brilliant metallic green colour, which, when the knife-coated specimen was tilted, changed to a metallic blue. A corresponding knife application of these pigments on a white background exhibited, in comparison to the black background, a weaker but still clear green-blue tilt effect with high lustre. A relatively small magnet attracts these pigments over distances of up to 1 cm and they collect at the poles of the magnet. Using a dispersion of these magnetic LC pigments in a binder which has not yet been cured, it was possible, in a Petri dish, by application of a magnet to the outside of the bottom of the dish, to obtain patterns on the basis of the different alignment/orientation of the pigments in the magnetic field, which were fixed by curing the binder.

Example 6

Production of Inventive Cholesteric LC Pigments with Metallic Lustre

Analogously to Example 3, 20 g of a fumed silica (HDK® H 20, Wacker-Chemie GmbH, Munich) were incorporated into 1 kg of a green cholesteric LC mixture obtainable according to Example 2. From this cholesteric LC mixture, a crosslinked cholesteric film was obtained analogously to Example 4, from which it was possible to produce inventive LC pigments with dispersed silica analogously to Example 5. The pigments thus obtainable possessed a mean platelet diameter of approx. 35 μm. A knife application of 2% by weight of these pigments in a transparent binder (for example Tinted Clear Additive Deltron 941, PPG Industries, UK-Suffolk IP14 2AD) on a black background exhibited a brilliant metallic greenish colour which, when the knife-coated specimen was tilted, changed to a bluish hue. In comparison to cholesteric pigments made of the same LC mixture without addition of fumed silica, these inventive pigments exhibited quite different coloristic properties. They gave the impression of distinctly more metallic and brighter hues in each case at the different viewing angles.

The invention claimed is:

1. Liquid-crystal monolayer comprising a three-dimensionally crosslinked, cholesteric liquid-crystal mixture and nanoparticles, wherein said nanoparticles have a particle size of 1 to 999 nm and have properties selected from the group consisting of luminescence, fluorescence, phosphorescence and magnetism.

2. Liquid-crystal monolayer according to claim 1, wherein said nanoparticles are selected from the group consisting of metal oxides, iron oxides, magnetic powders, zinc oxide, fluorescent pigments, phosphorescent pigments, metals, metal alloys and chromatic pigments or mixtures thereof.

3. Liquid-crystal monolayer according to claim 1, wherein said nanoparticles have not been surface-treated.

4. Liquid-crystal monolayer according to claim 1, wherein said liquid-crystal mixture comprises
   A) 0.01-50% by weight, based on the total solids content, of nanoparticles selected from the group consisting of metal oxides, iron oxides, magnetic powders, zinc oxide, luminescent pigments, fluorescent pigments, phosphorescent pigments, metals, metal alloys and chromatic pigments or mixtures thereof,
   B) 20-99.5% by weight, based on the total solids content, of at least one or more than one three-dimensionally crosslinkable compound of the average general formula $Y^1\text{-}A^1\text{-}M^1\text{-}A^2\text{-}Y^2$ in which
   $Y^1, Y^2$ are the same or different and are each a polymerizable group, for example an acrylate or methacrylate radical, epoxy radical, isocyanate, hydroxyl, vinyl ether or vinyl ester radical,
   $A^1, A^2$ are identical or different radicals of the general formula $C_nH_{2n}$ in which n is an integer of 0 to 20 and one or more methylene groups may be replaced by oxygen atoms, and
   $M^1$ has the general formula

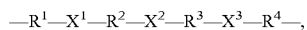

$R^1, R^2, R^3, R^4$ are identical or different divalent radicals selected from the group of —O—, —COO—, —CONH—, —CO—, —S—, —C≡C—, —CH=CH—, —N=N—, —N=N(O)— or a C—C bond, and $R^2$—$X^2$—$R^3$ or $R^2$—$X^2$ or $R^2$—$X^2$—$R^3$—$X^3$ may also be a C—C bond,
   $X^1, X^2, X^3$ are identical or different radicals selected from the group consisting of 1,4-phenylene, 1,4-cyclohexylene, $B^1$-, $B^2$- and/or $B^3$-substituted arylenes or heteroarylenes having 6 to 10 atoms in the aryl ring which may contain 1 to 3 heteroatoms from the group consisting of O, N and S, $B^1$-, $B^2$- and/or $B^3$-substituted cycloalkylenes having 3 to 10 carbon atoms, and
   $B^1, B^2, B^3$ are identical or different substituents selected from the group consisting of hydrogen, $C_1$-$C_{20}$-alkyl, $C_1$-$C_{20}$-alkoxy, $C_1$-$C_{20}$-alkylthio, $C_2$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —NO$_2$, formyl, acetyl, and alkyl, alkoxy or alkylthio radicals each interrupted by ether oxygen, thioether sulphur or ester groups and having 1-20 carbon atoms,
   C) 0.5 to 80% by weight, based on the total solids content, of at least one or more than one chiral compound of the average general formula $V^1\text{-}A^1\text{-}W^1\text{-}Z\text{-}W^2\text{-}A^2\text{-}V^2$ in which
   $V^1, V^2$ are the same or different and are each an acrylate or methacrylate radical, epoxy radical, vinyl ether or a vinyl ester radical, isocyanate radical, $C_1$-$C_{20}$-alkyl, $C_1$-$C_{20}$-alkoxy, $C_1$-$C_{20}$-alkylthio, $C_1$-$C_{20}$-alkoxycarbonyl, $C_1$-$C_{20}$-alkylthiocarbonyl, —OH, —F, —Cl, —Br, —I, —CN, —NO$_2$, formyl, acetyl, and alkyl, alkoxy or alkylthio radicals each interrupted by ether oxygen, thioether sulphur or ester groups and having 1-20 carbon atoms, or a cholesterol radical,
   $A^1, A^2$ are each as defined above,
   $W^1, W^2$ each have the general formula

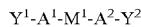

$R^1, R^2, R^3$ are each as defined above and $R^2$ or $R^2$—$X^2$ or $X^1$—$R^2$—$X^2$—$R^3$ may also be a C—C bond,
   $X^1, X^2$ are each as defined above and
   Z is a divalent chiral radical from the group comprising dianhydrohexitols, hexoses, pentoses, binaphthyl derivatives, biphenyl derivatives, tartaric acid derivatives or optically active glycols and, in the case that $V^1$ or $V^2$ is a cholesterol radical, is a C—C bond.

5. Liquid-crystal monolayer according to claim 1, wherein said monolayer has a film thickness of 0.5 to 50 mm.

6. Process for producing a liquid-crystal monolayer according to claim 1, wherein a mixture of three-dimensionally crosslinking cholesteric liquid crystals and nanoparticles is used to obtain a film of thickness 0.5 to 50 mm on a support, and the three-dimensional polymerization of the liquid-crystal film is subsequently carried out,
   wherein said nanoparticles have a particle size of 1 to 999 nm and have properties selected from the group consisting of luminescence, fluorescence, phosphorescence and magnetism.

7. Process according to claim 6, wherein said mixture of three-dimensionally crosslinking cholesteric liquid crystals and nanoparticles is prepared by admixing nanoparticles at a temperature above the clearing point of the cholesteric liquid-crystal mixture.

8. Liquid-crystal monolayer pigments comprising a monolayer with a three-dimensionally crosslinked, cholesteric liquid crystal mixture and nanoparticles,
   wherein said nanoparticles have a particle size of 1 to 999 nm and have properties selected from the group consisting of luminescence, fluorescence, phosphorescence and magnetism.

9. Liquid-crystal pigments according to claim 8, wherein said pigments have a thickness of 0.1 to 50 mm and a diameter of 10 to 1000 mm.

10. Liquid-crystal pigments according to claim 8, wherein said pigments comprise nanoparticles which have magnetic properties.

11. A process for producing cholesteric liquid-crystal monolayer pigments, said process comprising steps of
   eroding a monolayer comprising a three-dimensionally crosslinked, cholesteric liquid crystal mixture and nanoparticles to produce coarse liquid-crystal flakes, and then
   comminuting said flakes to produce liquid-crystal pigment particles, wherein said nanoparticles have a particle size of 1 to 999 nm and have properties selected from the group consisting of luminescence, fluorescence, phosphorescence and magnetism.

12. The process of claim 11, further comprising a step of classifying said pigment particles.

* * * * *